United States Patent [19]
Varga

[11] 3,772,945
[45] Nov. 20, 1973

[54] TUBE CUTOFF DEVICE

[75] Inventor: John F. Varga, Harbert, Mich.

[73] Assignee: Weldun Tool and Engineering Co., Bridgman, Mich.

[22] Filed: May 18, 1972

[21] Appl. No.: 254,763

[52] U.S. Cl............................ 82/70.2, 82/73, 82/83, 82/92, 82/101
[51] Int. Cl. ........................................................ B23b
[58] Field of Search.................... 82/70.1, 70.2, 71, 82/72, 73, 89, 102, 20

[56] References Cited
UNITED STATES PATENTS

| | | |
|---|---|---|
| 3,641,851 | 2/1972 | Gibbs et al.............................. 82/73 |
| 2,112,396 | 3/1938 | Corrigan............................... 82/4 X |

*Primary Examiner*—Andrew R. Juhasz
*Assistant Examiner*—W. R. Briggs
*Attorney*—James D. Hall

[57] ABSTRACT

A cutoff device for tubing which includes a guide member serving to direct a tube along a selected axis. A cutoff member is carried by the guide member and is rotatable about the tube guide axis. The rotatable cutoff member which carries a shiftable cutter part serves to cut the tube into selected lengths.

1 Claim, 7 Drawing Figures

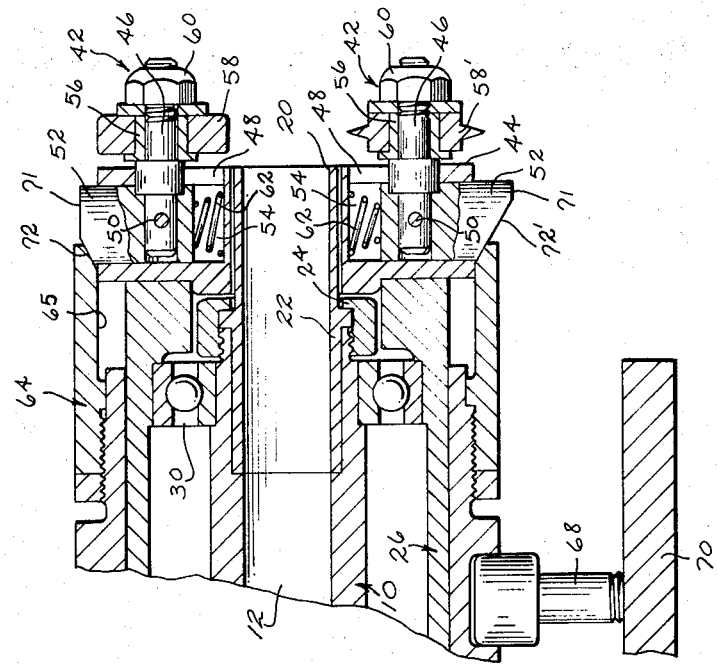
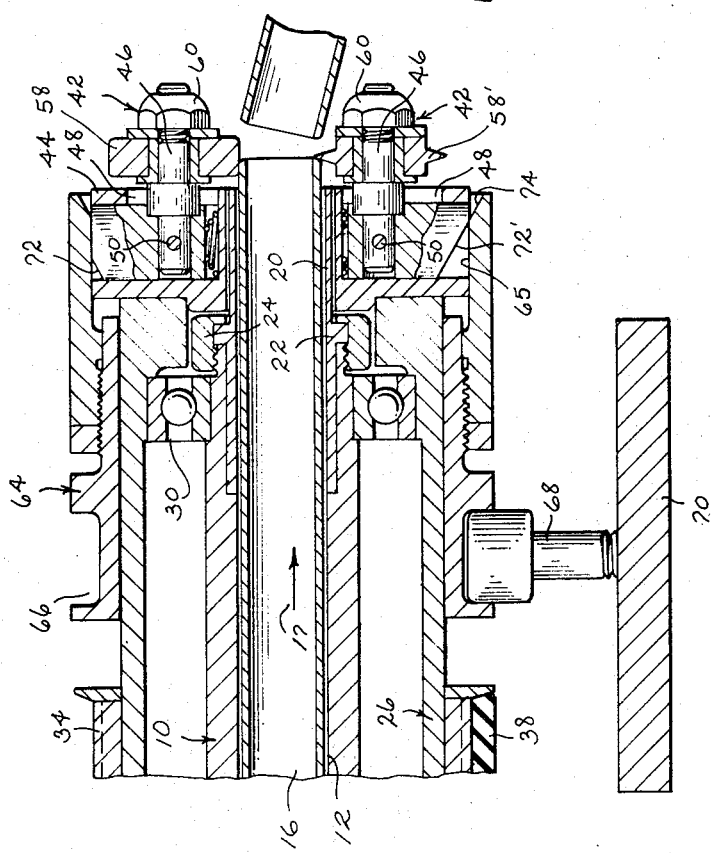

TUBE CUTOFF DEVICE

SUMMARY OF THE INVENTION

This invention relates to a device for cutting tubing into selected lengths. The cutoff device of this invention includes guide means for directing a tube along a selected axis and cutter means which is rotatable about the guide means. The rotatable cutter means includes a plurality of tube contact members which during rotation of the cutter means serve to make contact with the tube. One of the tube contact members constitutes a cutter part which upon rotation with the cutter means causes the tube to be cut into selected lengths. The tube contact members are shiftable radially relative to the guide axis of the guide means between positions spaced from and in contact with the tube through the cooperative action of a camming means and centrifugal force.

Accordingly, it is an object of this invention to provide a cutoff device for tubing which is of efficient operation.

Another object of this invention is to provide a cutoff device for tubing which is of safe and rapid operation.

Another object of this invention is to provide a tube cutting device which produces minimal burring at the separated edges of the tube sections.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 6 is a fragmentary sectional view showing the cutoff device in another operative position in which the tube has been cut to a selected length.

FIG. 7 is a fragmentary detailed sectional view taken along line 7—7 of FIG. 1 showing the cutoff device in still another operative position.

DESCRIPTION OF THE PREFERRED EMBODIMENT

Figure 1:
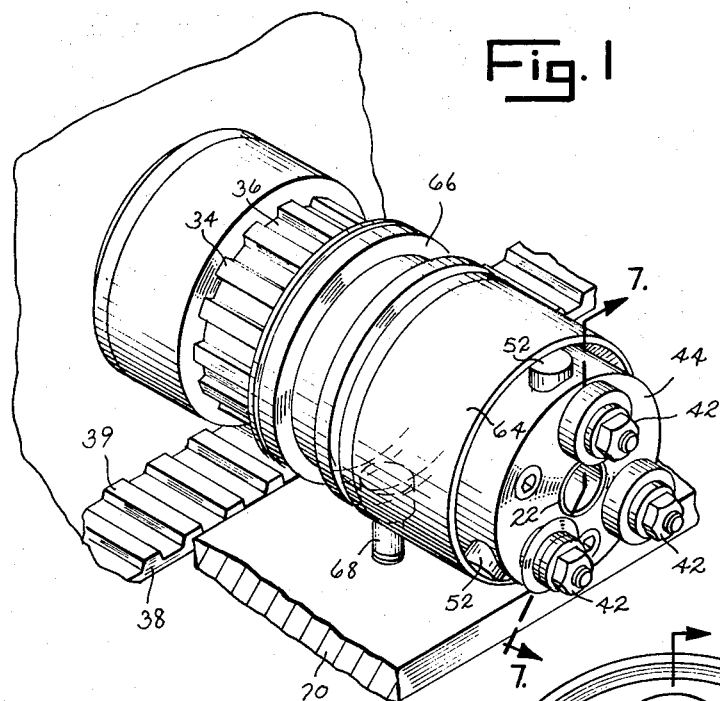
FIG. 1 is a perspective view of a tubing cutoff device.
Figure 3:
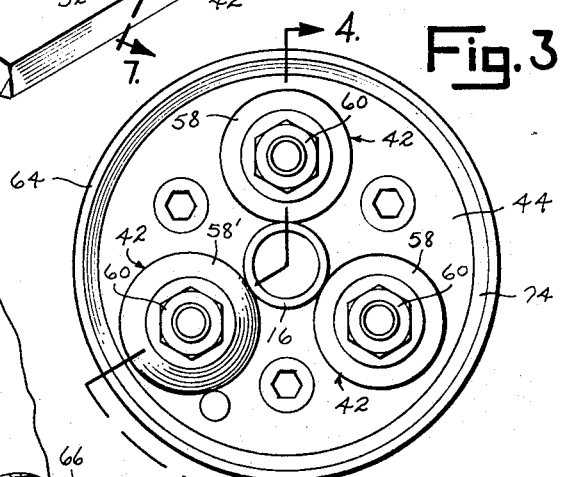
FIG. 3 is an end view of the cutoff device of FIG. 2 as seen along line 3—3 thereof.
Figure 2:
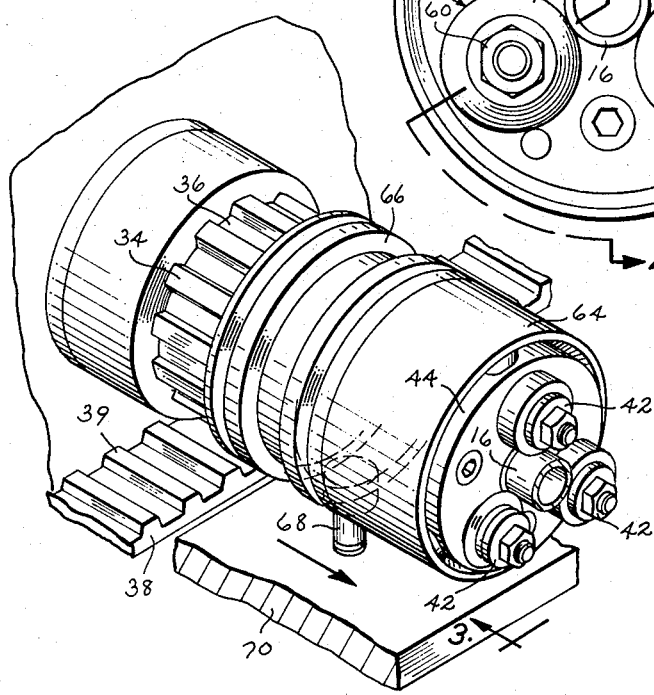
FIG. 2 is a perspective view of the cutoff device of FIG. 1 showing a tube being positioned in preparation for cutting.
Figure 5:
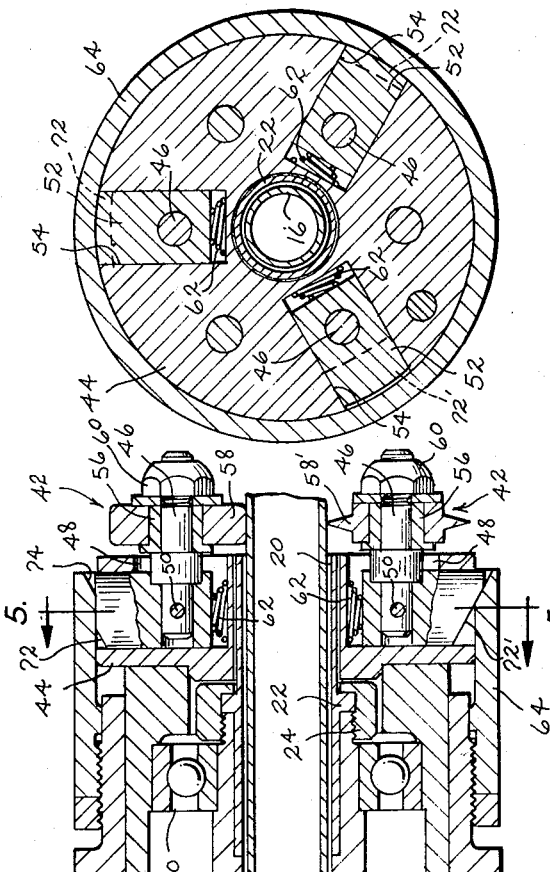
FIG. 5 is a cross sectional view taken along line 5—5 of FIG. 4.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The illustrated embodiment of the cutoff device of this invention includes a guide part 10 having a longitudinal axial bore 12 therethrough. Guide part 10 serves to direct the advancement of a tube 16 which is fed in the direction of arrow 17 by suitable means (not shown) through bore 12. Guide part 10 includes a feed end portion 14 which is connected to a suitable fixed support 18 and a discharge end portion 20 which is defined by a bushing 22. Bushing 22 fits within the main body portion of the guide part 10 and secured thereto by means of a lock nut 24. Bushing 22 is interchangeable, having an inner diameter of varying size to accommodate tubes 16 having outer diameters of varying dimensions. Through the use of interchangeable bushing 22 the main body portion of guide part 10 can be economically constructed of one size.

A sleeve 26 encircles guide part 10. Sleeve part 26 is supported by bearing members 28 and 30 for coaxial rotation about guide part 10. Lock nut 32 serves to position bearing member 28. Sleeve 26 includes a flanged pulley portion 34 having a plurality of of circumferentially spaced indentations 36 formed therein. A drive belt 38, shown in fragmentary form in the drawings and having a plurality of teeth 39 formed thereon, contacts sleeve pulley portion 34 with teeth 39 engaging pulley indentations 36. Belt 38 is preferably endless and is drive connected to a suitable drive means (not shown) which causes rotation of the belt and the resulting rotation of sleeve 26 about guide part 10.

Sleeve 26 carries three shiftable tube contact members 42. Tube contact members 42 are positioned adjacently outwardly of the discharge end portion 20 of guide part 10 and are supported for radial shiftable movement relative to the axis of guide part 10 by an end plate 44. End plate 44 forms an integral part of sleeve 26 and is fitted around bushing 22 of the guide part. A slight clearance preferably exists between end plate 44 and bushing 22 so that upon rotation of sleeve 26 frictional contact between the rotating end plate and the stationary bushing is prevented. Tube contact members 42 are equal-angularly spaced apart. Each tube contact member 42 includes a pin 46 which extends through a radially oriented slot 48 in the outer face of end plate 44. One end of each pin 46 is connected by a pin 50 to a slide 52 housed for shiftable movement within a radial opening 54 in plate 44. The opposite or outer end of each pin 46 carries a bushing 56 upon which is journaled a rotatable disk member 58 or 58'. A retainer nut 60 is turned upon the outer end of each pin 46 and serves to retain the disk member upon the pin.

A helical spring 62 is positioned in the bottom or base of each end plate opening 54 in contact with the slide 52 therein. Each spring 62 serves to urge its contacting slide radially outwardly and against an annular camming member 64. Camming member 64 fits upon sleeve 26 and is coaxially positioned relative to the axis of guide part 11. Camming member 64 which constitutes threaded interlocking parts for adjusting disk member 58' is free to rotate with sleeve 26 and has a circumferential groove 66 formed therein. An actuator pin 68 fits within groove 66. Pin 68 is connected to an actuator plate 70 which is shiftable longitudinally relative to guide part 10 and which causes movement of camming member 64 between the fore and aft positions illustrated in FIGS. 6 and 7 respectively. To reduce the friction between pin 68 and the camming member at its groove 66, the pin may be provided with a rotatable head.

Figure 4:
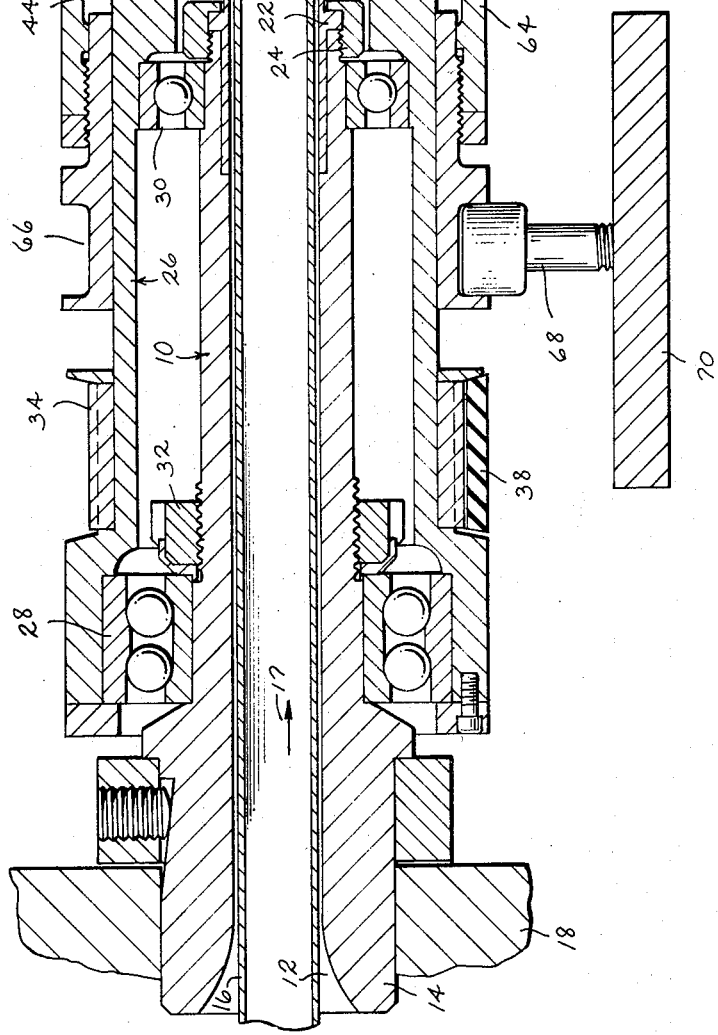
FIG. 4 is a detailed sectional view taken along line 4—4 of FIG. 3.

Each slide 52 housed within end plate 44 includes a flat outer end 71 which is interrupted by a beveled cam surface 72 or 72'. Camming member 64 has an inner cylindrical surface 65 interrupted by a beveled surface 74 at the outer end of the camming member. The cam surface, designated by the reference numeral 72', of one slide 52 is more extensive than the cam surfaces 72 of the remaining slides 52. As camming member 64 is shifted from its aft position shown in FIG. 7 through the position shown in FIG. 4 into its fore position shown in FIG. 6, surface 74 thereof makes sliding contact with surfaces 72 and 72' of slides 52 and causes the slides to be urged radially inwardly, compressing springs 62. During movement of camming member 64 between its fore and aft positions, sleeve 26 is continuously rotated. As camming member 64 is shifted from its fore into its aft position, springs 62 in conjunction with the centrifugal force exerted upon slides 52 during rotation of sleeve 26 urges the slides radially outwardly into the positions shown in FIG. 7.

At least one of the disk members, designated by the reference numeral 58', journaled upon pins 46 is in the form of a circumferential cutter blade. The remaining disk members 58 are of a flattened roller type construction whose purpose is to support the extended end portion of tube 16 which projects from guide discharge end portion 20 as cutter 58' enters the side wall of the tube and circumferentially severs the extended portion from the remainder of the tube carried within guide part 10.

The radius of the non-cutting roller disks 58 and the location of, as measured from the axes of supporting pins 46, and extent of cam surfaces 72 and ends 71 of the pin carrying slides 52 are so dimensioned that with camming member 64 located in its aft position shown in FIG. 7 roller disks 58 will be spaced from the extended end portion of the tube as it projects from guide part bore 12 and that with member 64 located in its fore position shown in FIG. 6 roller disks 58 will make slight contact with the tube extended end portion. The radius of cutting disk 58' and the location of, as measured from the axis of cutting disk pin 46, and extent of cam surface 72' and end 71 of the pin carrying slide 52 are so dimensioned that with camming member 64 located in its aft position shown in FIG. 7 disk 58' will be spaced from the tube as it extends through guide part bore 12 and that with member 64 located in its fore position shown in FIG. 6 disk 58' will protrude through the side wall of the tube extended end portion. During rotation of sleeve 26 and the advancement of camming member 64 into its fore position, disks 58 and 58' move radially inwardly toward the tube in simultaneous fashion until camming member 64 reaches ends 71 of roller slides 52 with the disks contacting the outer surface of the tube. At this time due to the larger extent of cam surface 72' of the cutting disk slide 52 disk 58' will continue to be urged radially inwardly into contact with and through the side wall of tube 16 as seen in FIG. 6 as the sleeve 26 and cutter disk 58' rotate as a unit about the tube. Due to the journaled nature of disks 58 and 58', the disks will roll over the tube as sleeve 26 is rotated. During the cutting action guide part 10 is held stationary with tube 16 non-rotatively extending therethrough. Sleeve 26, including its end plate 44, rotates about the axis of guide part 10 at speeds of 1,750 rpm's or higher, depending upon the size and type of material of the tubing to be cut. Once the extended end portion of the tube has been severed, camming member 64 is shifted rearwardly or into its aft position relative to the discharge end portion 20 of guide part 10 to permit slides 52 to be shifted radially outwardly under the influence of springs 62 and centrifugal force, thereby moving roller disks 58 and cutter disk 58' into the inoperative positions shown in FIG. 7 spaced from the tube which is then advanced along the axis of the guide bore a selected length in preparation for another cutting sequence.

It is to be understood that the invention is not to be limited to the details herein given but may be modified within the scope of the appended claims.

What I claim is:

1. A cutoff device for a tube comprising means for guiding said tube along an axis, means rotatable about said guide means and having an axis of rotation coinciding with said guide means axis, said guide means having a discharge end, said rotatable means extending to adjacent said discharge end, at least three tube contact means carried by said rotatable means adjacent said discharge end, said tube contact means being angularly spaced about said guide means axis, two of said tube contact means being shiftable radially of said guide means axis between an inner position wherein said tube will be contacted by said tube contact means and an outer position spaced from said tube when said tube is supported in said guide means, one other of said tube contact means constituting a tube cutter blade means being shiftable radially of said guide means axis between an inner position wherein said cutter blade means will extend through the side wall of said tube and an outer position spaced from said tube when said tube is supported by said guide means, means for rotating said rotatable means and causing rotation of said tube contact means about said guide means axis, and actuator means for shifting said tube contact means together from their said outer positions into their respective said inner positions during rotation of said rotatable means with said tube projecting outwardly of said discharge end between said tube contact means, said guide means being a tubular member having a longitudinal tube receiving bore, said rotatable means including a sleeve journaled over said tubular member, each tube contact means including a disk-shaped part journaled to said sleeve about an axis paralleling said guide means axis, the disk-shaped parts of said two tube contact means constituting rollers, the disk-shaped part of said one other tube contact means constituting said cutter blade means having a circumferential cutting edge, said sleeve including an outer surface and having three angularly spaced bores formed therein, said spaced bores extending radially relative to said guide means axis and having open ends at said sleeve outer surface, a slide member shiftably located in each spaced bore and carrying a tube contact means for movement between its said outer and inner positions, each slide member having a cam defining outer end located adjacent the outer surface of said sleeve, said actuator means being shiftable over said sleeve outer surface and including means engaging the cam defining outer ends of the slide members for causing shiftable movement of said slide members within said bores and corresponding movement of said tube contact means between their outer and inner positions, said actuator means con-stituting an annular member surrounding said sleeve, said annular member including first and second coaxial parts, adjustable threaded interlock means connecting said first and second parts, said first part defining said means engaging the cam defining outer slide member ends, said second part defining means for shifting said first part over said slide member ends, said interlock means for varying the length of said actuator means, the amount of shiftable movement of the slide carrying said one other tube contact means being dependent upon the length of said actuator means.

* * * * *